United States Patent
Owens

(10) Patent No.: US 10,206,022 B2
(45) Date of Patent: Feb. 12, 2019

(54) TOUCH SCREEN CONTROL DEVICE WITH SPEAKERS

(71) Applicant: Crestron Electronics, Inc., Rockleigh, NJ (US)

(72) Inventor: Wayne Owens, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/183,874

(22) Filed: Jun. 16, 2016

(65) Prior Publication Data

US 2016/0373844 A1 Dec. 22, 2016

Related U.S. Application Data

(60) Provisional application No. 62/180,123, filed on Jun. 16, 2015.

(51) Int. Cl.
*H04R 5/02* (2006.01)
*H04R 1/02* (2006.01)
*G06F 1/16* (2006.01)

(52) U.S. Cl.
CPC ........... *H04R 1/028* (2013.01); *G06F 1/1632* (2013.01); *H04R 5/02* (2013.01); *H04R 2499/15* (2013.01)

(58) Field of Classification Search
CPC ...... H04R 1/028; H04R 5/02; H04R 2499/15; G06F 1/1632
See application file for complete search history.

(56) References Cited

U.S. PATENT DOCUMENTS

| | | | |
|---|---|---|---|
| 2003/0004690 A1* | 1/2003 | Maeda | G06F 1/16 702/188 |
| 2012/0068832 A1* | 3/2012 | Feldstein | F16M 11/041 340/12.5 |
| 2013/0257315 A1* | 10/2013 | Restrepo | H05B 37/0209 315/362 |

FOREIGN PATENT DOCUMENTS

CN 201741137 * 2/2009

* cited by examiner

*Primary Examiner* — Regina N Holder
(74) *Attorney, Agent, or Firm* — Crestron Electronics, Inc

(57) ABSTRACT

A touch screen control device is described herein with integrated speakers. Each of the left and right speakers are mounted on respective side walls such that their long axis is substantially vertical, and the bulk of the speaker, which is contained within the frame of touch screen control device, faces inwardly, in a substantially horizontal direction, so that a minimal amount of depth is needed to mount touch screen control device.

12 Claims, 13 Drawing Sheets

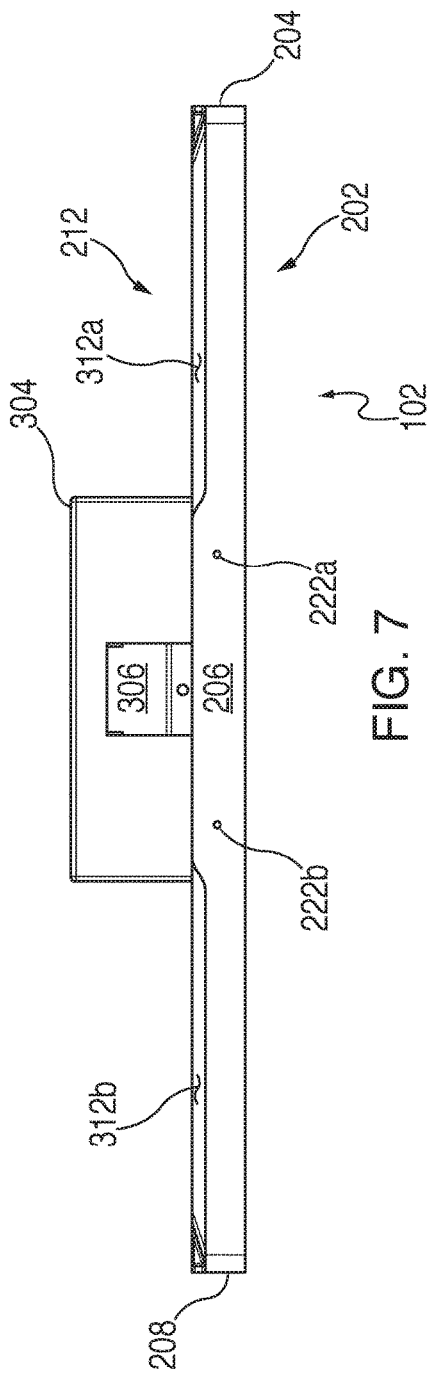
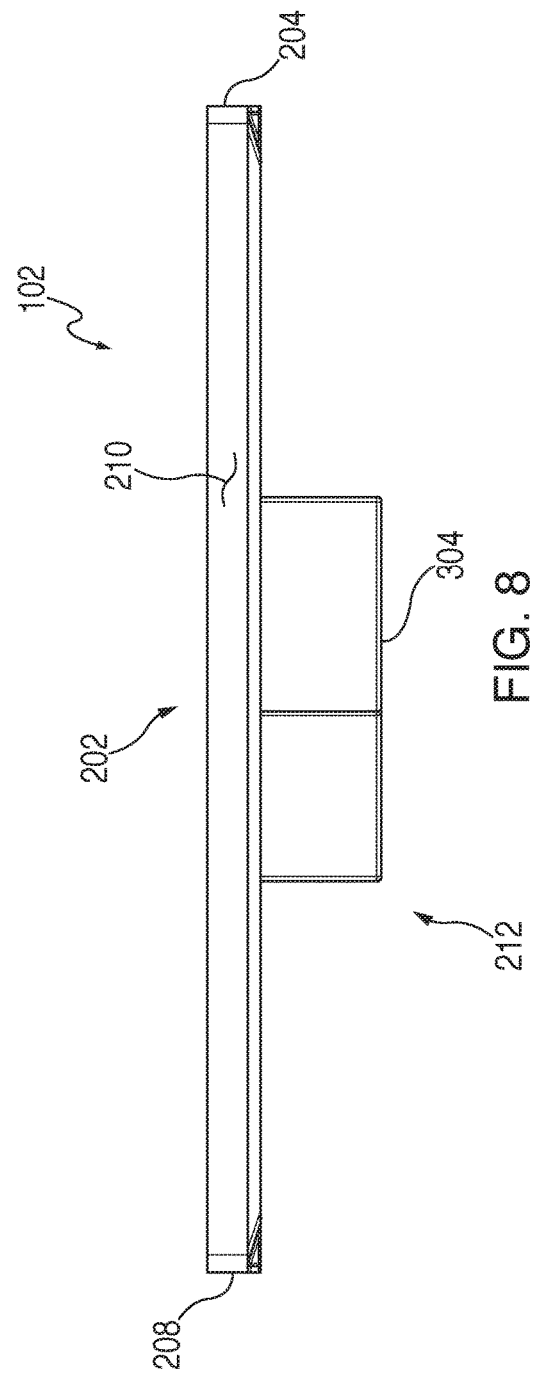

TOUCH SCREEN CONTROL DEVICE WITH SPEAKERS

PRIORITY INFORMATION

The present application claims priority under 35 U.S.C. § 119(e) to U.S. Provisional Patent Application Ser. No. 62/180,123, filed 16 Jun. 2015, the entire contents of which are expressly incorporated herein by reference.

BACKGROUND

Technical Field

Aspects of the embodiments relate generally to touch screens that can be used to control different automated systems in both commercial and residential environments, and more specifically to systems, methods, and modes for a touch screen control device that has integrated within it one or more speakers, but yet which maintains a substantially thin mounting profile.

Background Art

Other wall mounted touch screen control devices exhibit a protruding profile due to placement of speakers. Such devices are unsightly and can be obtrusive.

Accordingly, a need has arisen for systems, methods, and modes for a touch screen control device that has integrated within it one or more speakers, but yet which maintains a substantially thin mounting profile.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for a touch screen control device that has integrated within it one or more speakers, but yet which maintains a substantially thin mounting profile that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to an aspect of the embodiments, a substantially slim, unobtrusive wall mounted touch screen control device is provided comprising a touch screen interactive display, a plurality of hard buttons arranged in a substantially vertical manner, one or more integrated side-wall mounted speakers, and a chamfered side wall.

According to aspects of the embodiments, a controller for use in controlling one or more controllable devices is provided, comprising: a cubic enclosure, the cubic enclosure including a front surface that is a substantially flat planar surface, a left and right side, a top and bottom side, and a rear surface; an interactive display panel disposed on the front surface of the controller, wherein the front surface is adapted to provide access to the display panel; a circuitry enclosure attached to the rear surface of the controller, the circuitry enclosure adapted to enclose controller circuitry, and is further adapted to interface with a junction box located in the wall, such that the controller is removably attachable to the junction box; and a plurality of chamfered surfaces formed on the rear surface, the chamfered surfaces adapted to provide a removing function for the controller, when it is desired to remove the controller from the junction box.

According to the first aspect of the embodiments, each of the plurality of chamfered surfaces comprises an angled surface that is formed at an angle of about 18° from the rear surface.

According to the first aspect of the embodiments, each of the plurality of chamfered surfaces comprises an angled surface that is formed at an angle that ranges from about 10° to about 26° from the rear surface.

According to the first aspect of the embodiments, the ratio of width of the controller to the depth of the controller is about 12.07, and wherein the ratio of height of the controller to the depth of the controller is about 7.80.

According to the first aspect of the embodiments, the ratio of width of the controller to the depth of the controller is about 16.21, and wherein the ratio of height of the controller to the depth of the controller is about 10.12.

According to the first aspect of the embodiments, the ratio of width of the controller to the depth of the controller is about 21.61, and wherein the ratio of height of the controller to the depth of the controller is about 13.78.

According to the first aspect of the embodiments, the controller further comprises a mounting bracket adapted to provide a mounting surface to the controller, and wherein the mounting bracket is adapted to interface with both the circuitry enclosure and the junction box.

According to the first aspect of the embodiments, the mounting bracket comprises: a substantially planar portion adapted to interface with, and mount to, the junction box; and a three dimensional cubic portion of substantially similar size and dimension to the circuitry enclosure such that the circuitry enclosure fits in a removably attachable manner to the three dimensional cubic portion.

According to the first aspect of the embodiments, the mounting bracket comprises: a plurality of substantially planar surfaces orthogonal to the substantially planar portion, wherein each of the substantially planar surfaces orthogonal to the substantially planar portion comprises a spring loaded dimple mount, each of the plurality of spring loaded dimple mounts including a dimpled protrusion, and each of the plurality of dimpled protrusions is adapted to fit within a respective one of a dimpled recess located on a corresponding surface of the circuitry enclosure, such that an interaction between each of the dimpled protrusions within the dimpled recesses causes the controller to be retained to the mounting bracket that is attached to the junction box.

According to the first aspect of the embodiments, the chamfered surfaces provide access to a device to pry the controller out of and away from the junction box.

According to the first aspect of the embodiments, each of the chamfered surfaces is adapted to be used by one or more fingers of a user to remove the controller from the junction box.

According to the first aspect of the embodiments, the controller further comprises one or more speakers, each of the one or more speakers located on either or both of a right side and left side of the controller, and wherein each of the one or more speakers comprises a long axis and a short axis, and further wherein the long axis of the speaker is substantially parallel to each of the left and right sides of the controller.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
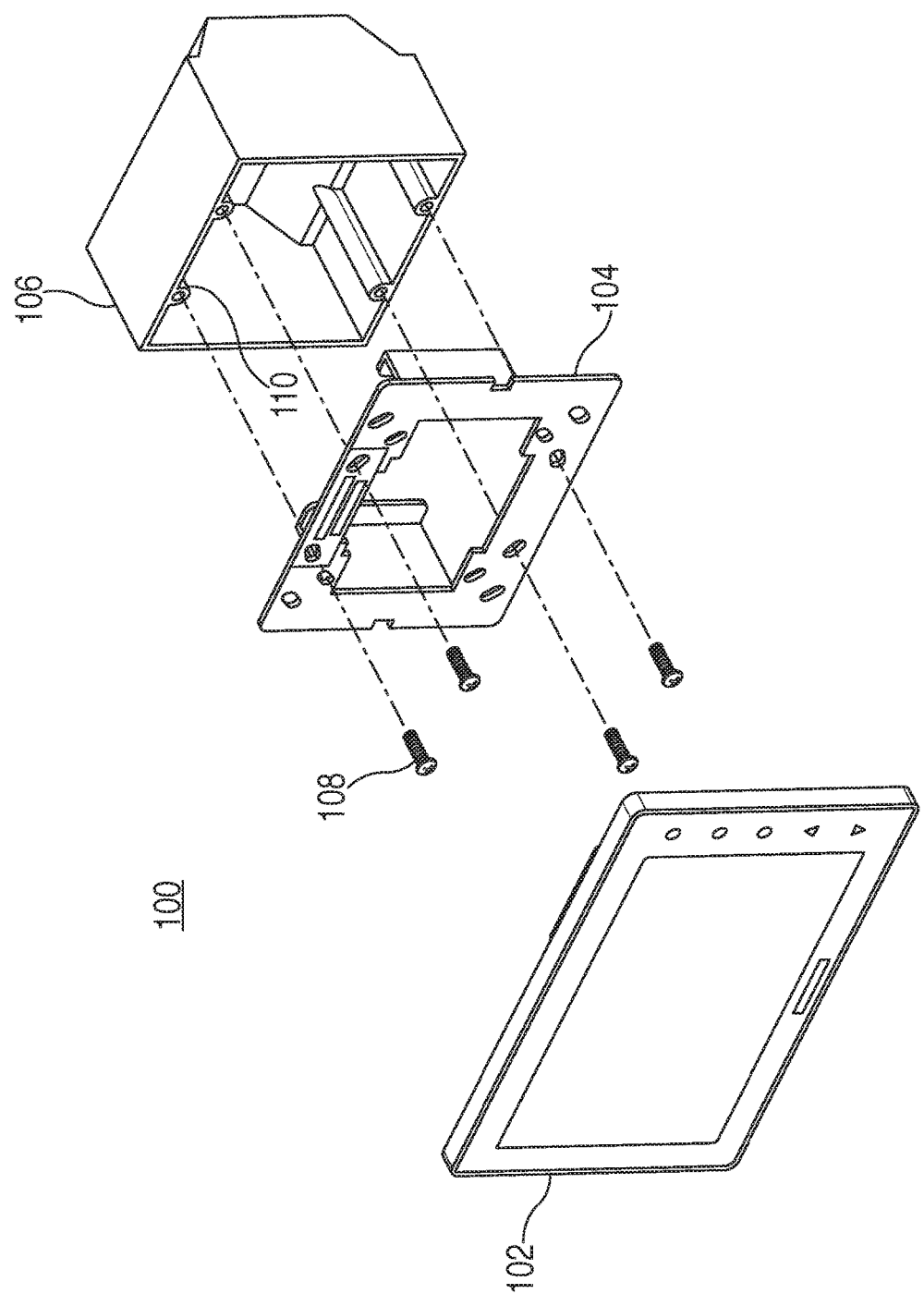

FIG. 1 illustrates a front isometric view of a wall mounted touch screen control device assembly according to aspects of the embodiments.

Figure 2:
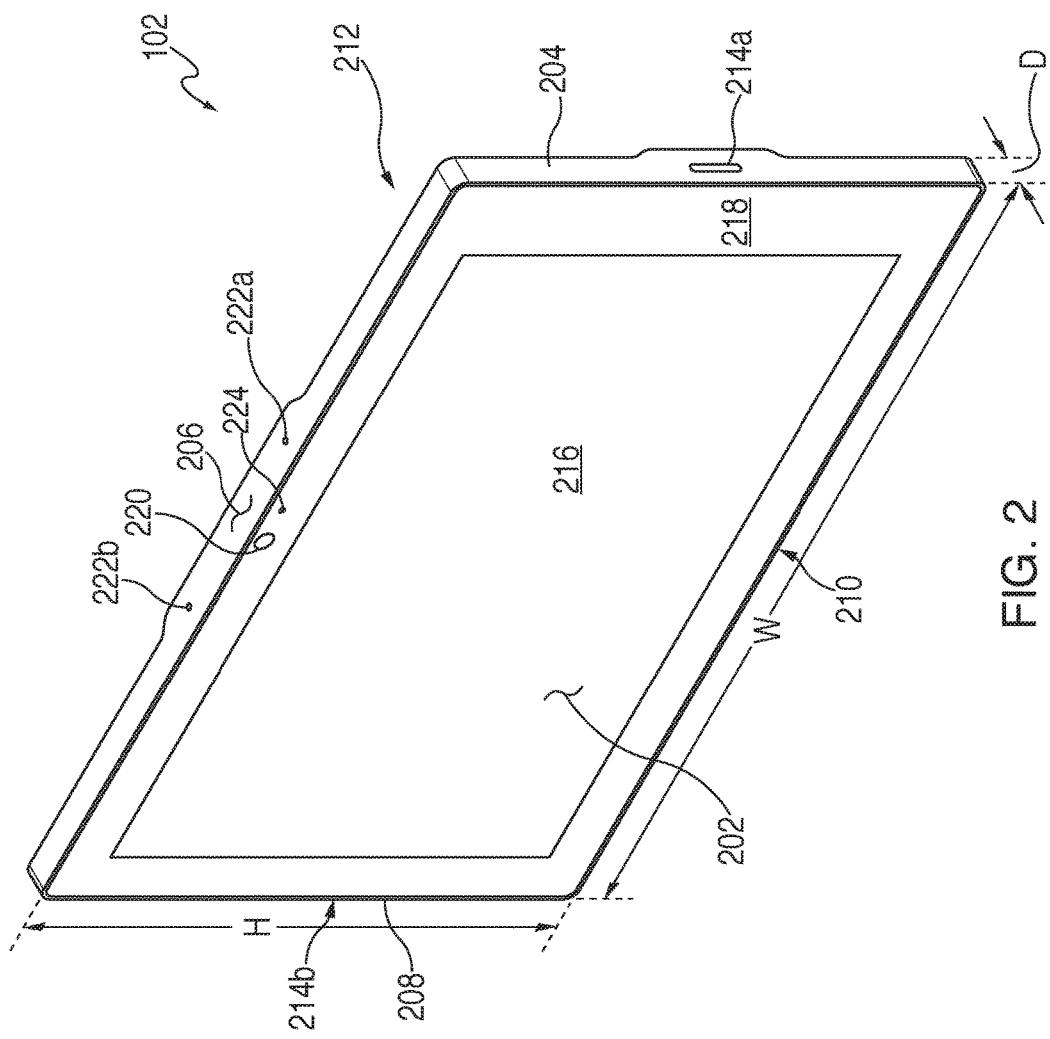

FIG. 2 illustrates a front isometric view of a wall mounted touch screen control device with integrated speakers according to aspects of the embodiments.

Figure 3:
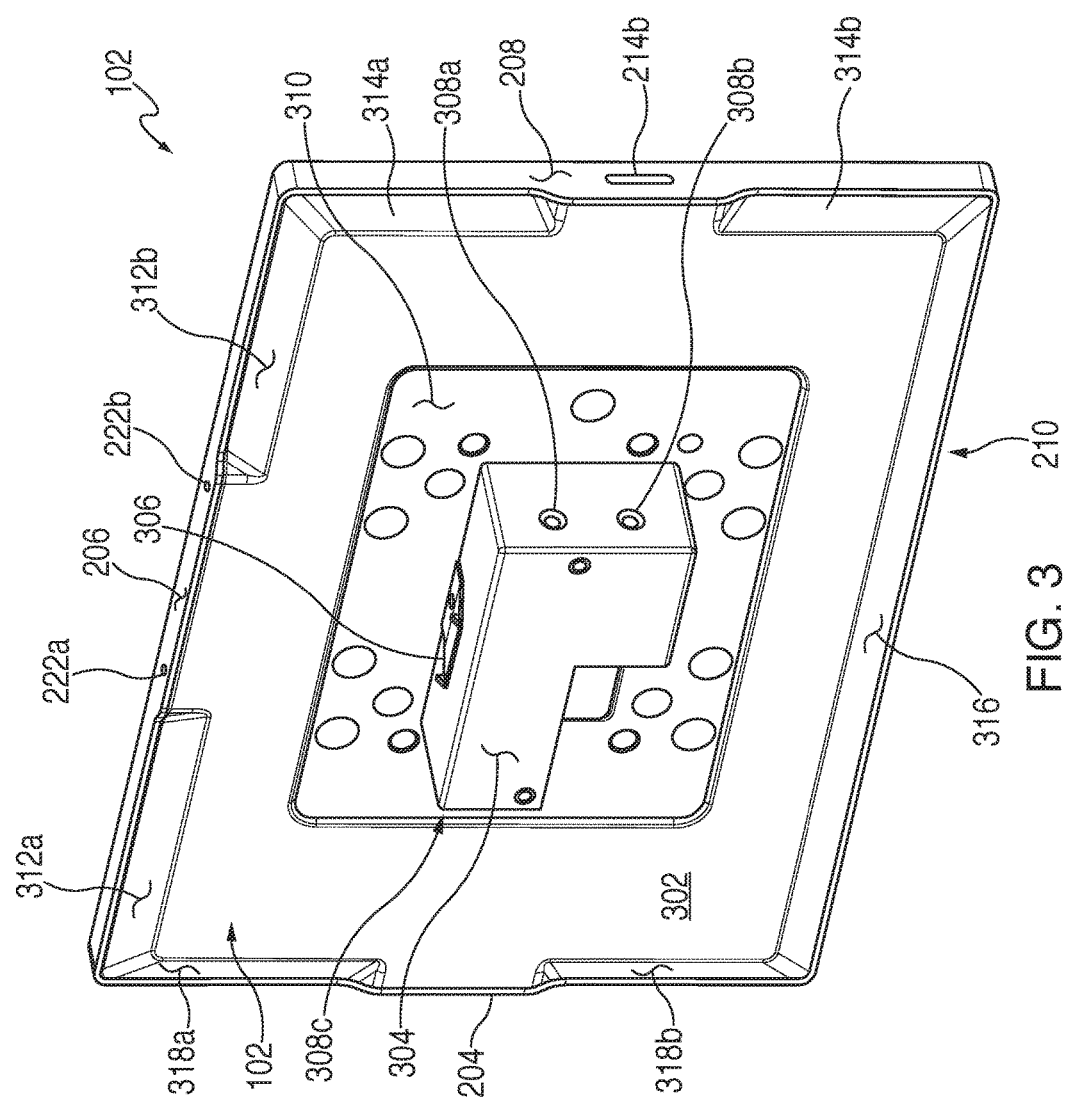

FIG. 3 illustrates a left side rear isometric view of the wall mounted touch screen control device of FIG. 1.

Figure 4:
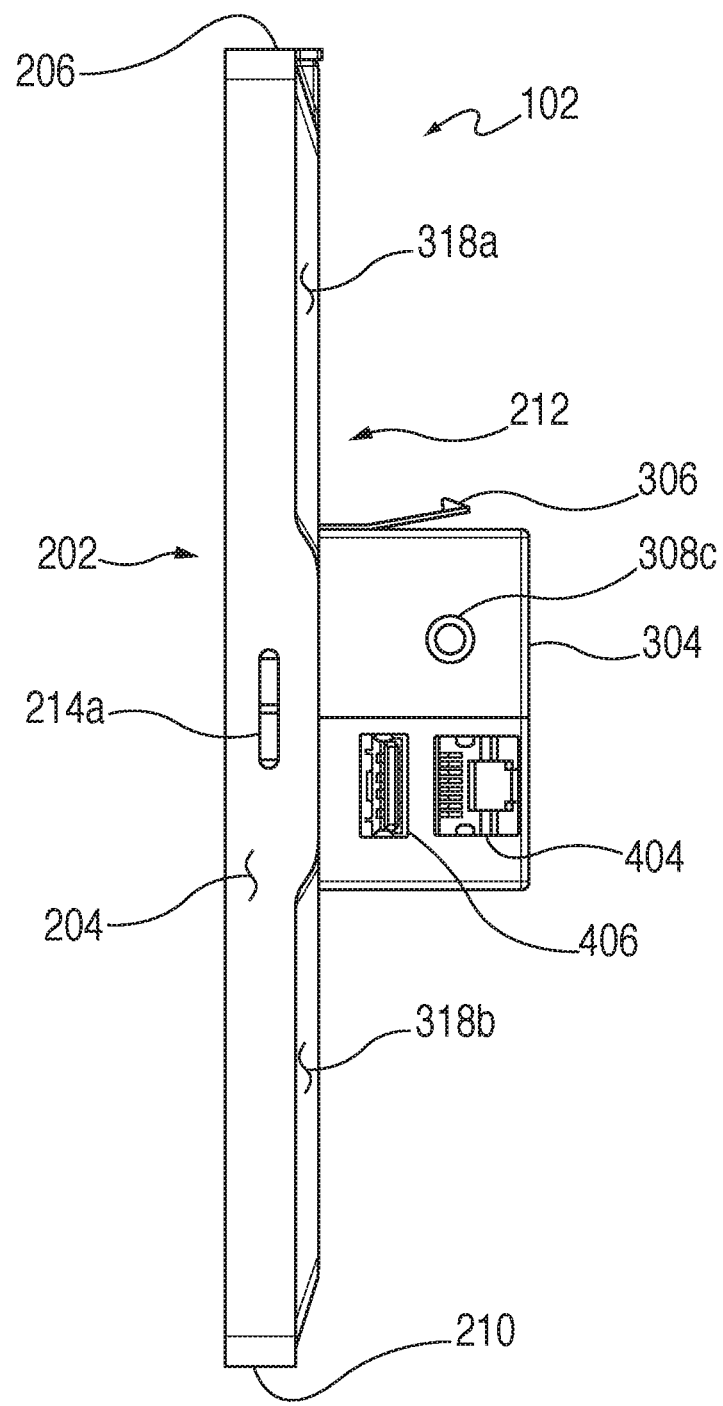

FIG. 4 illustrates a right side view of the wall mounted touch screen control device of FIG. 1.

Figure 5:
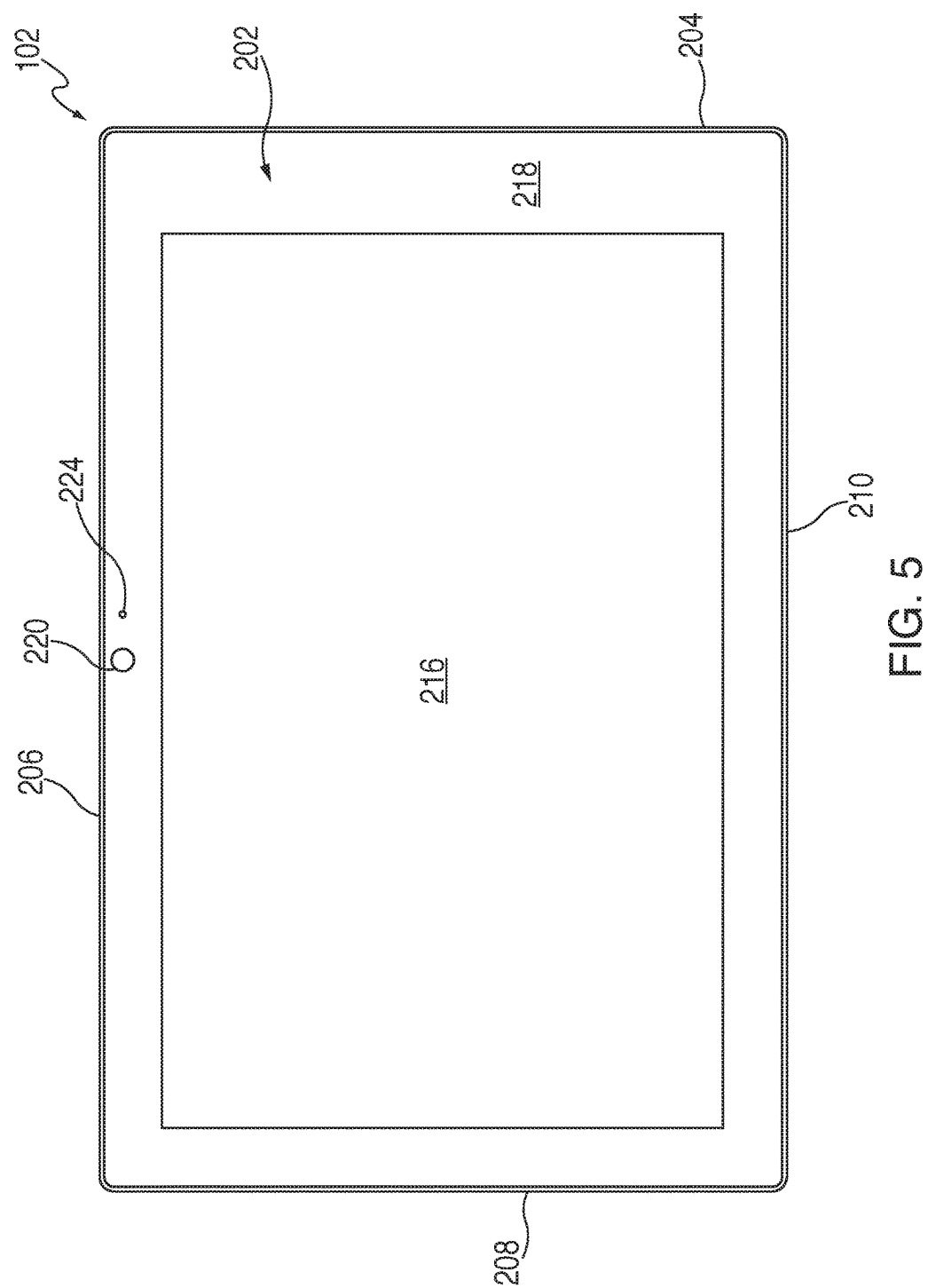

FIG. 5 illustrates a front view of the wall mounted touch screen control device of FIG. 1.

Figure 6:
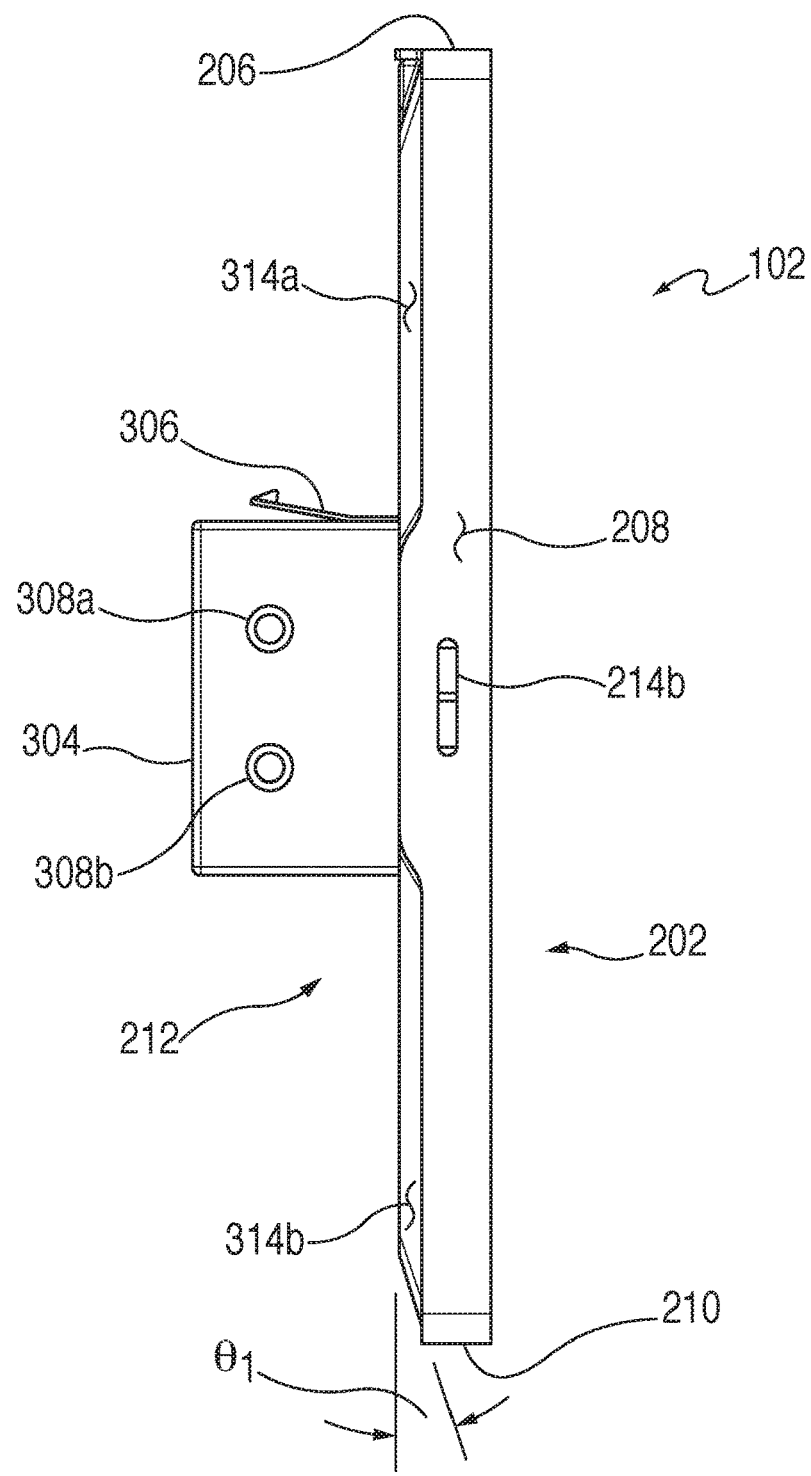

FIG. 6 illustrates a left side view of the wall mounted touch screen control device of FIG. 1.

FIG. 7 illustrates a top view of the wall mounted touch screen control device of FIG. 1.

FIG. 8 illustrates a bottom view of the wall mounted touch screen control device of FIG. 1.

Figure 9:
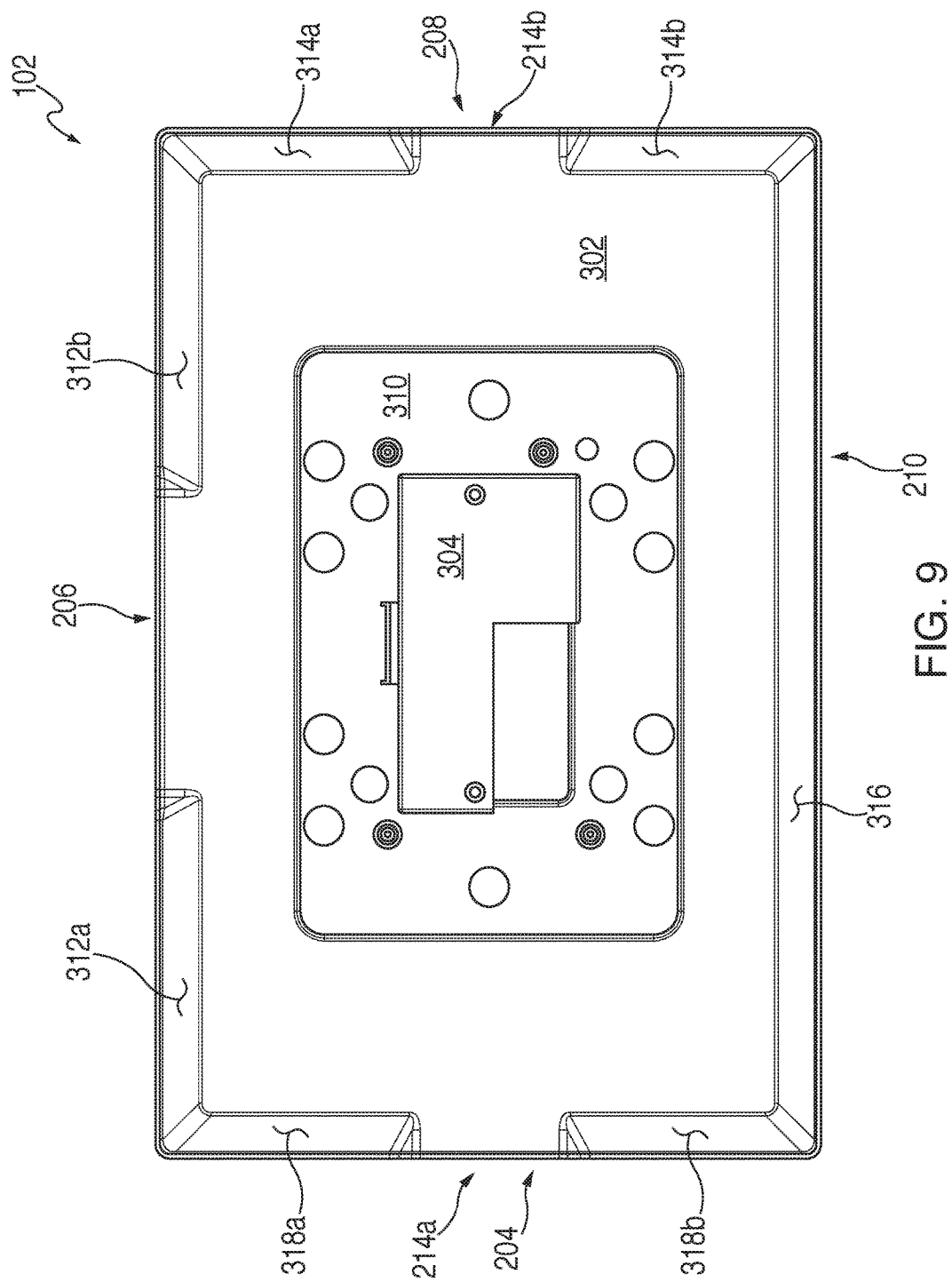

FIG. 9 illustrates a rear view of the wall mounted touch screen control device of FIG. 1.

Figure 10:
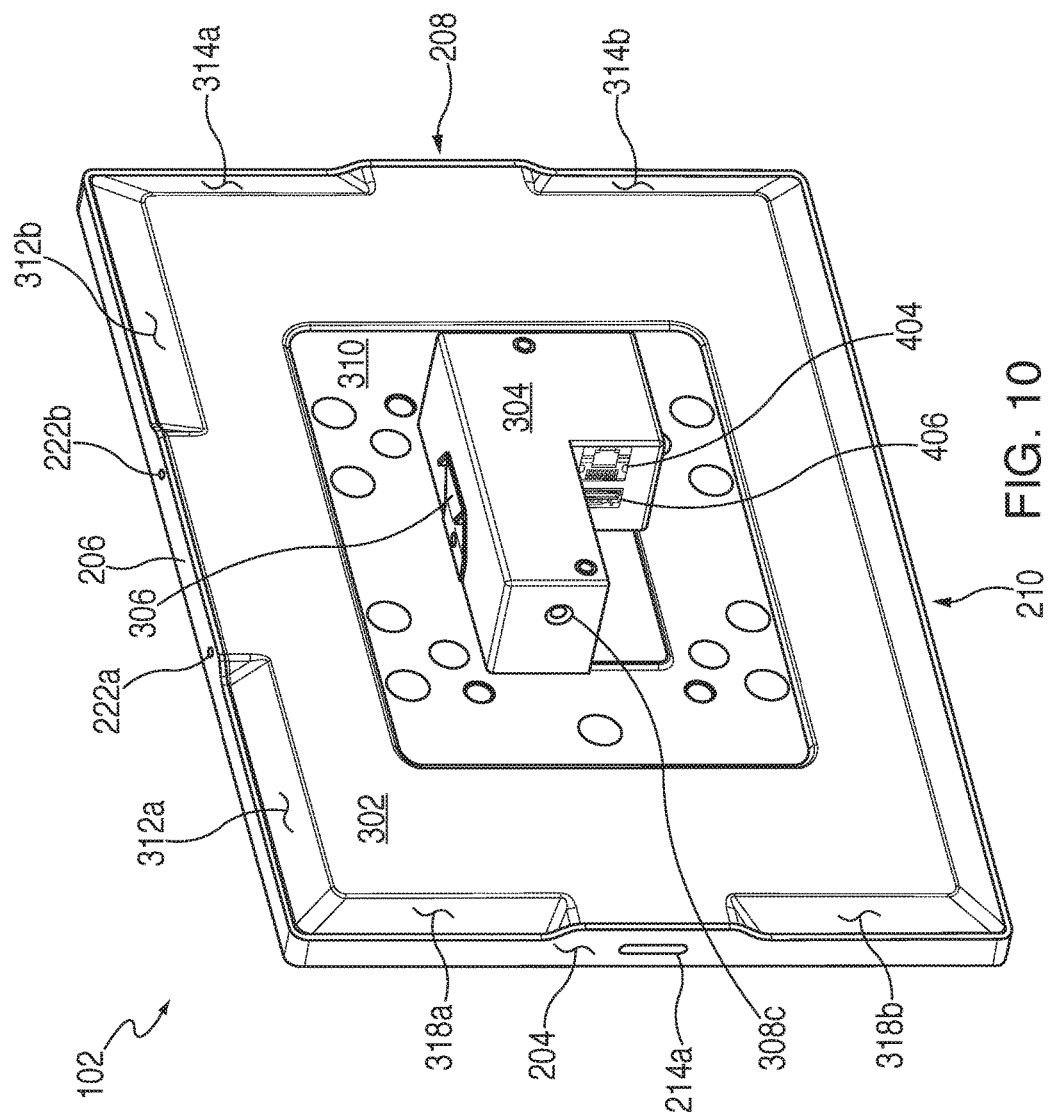

FIG. 10 illustrates a right side rear isometric left view of the wall mounted touch screen control device of FIG. 1.

Figure 11:
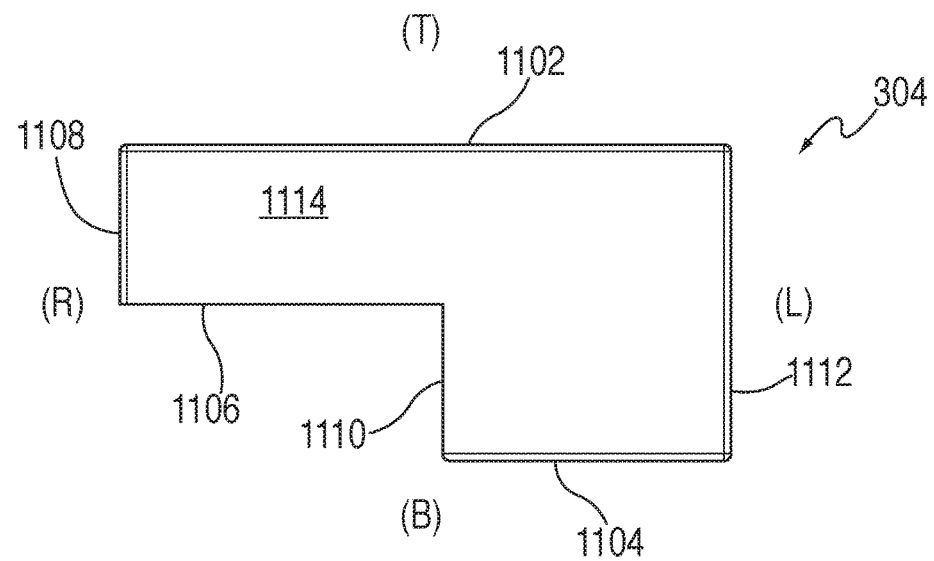

FIG. 11 illustrates a rear view of a circuitry enclosure for use with the wall mounted touch screen control device of FIG. 1.

Figure 12:
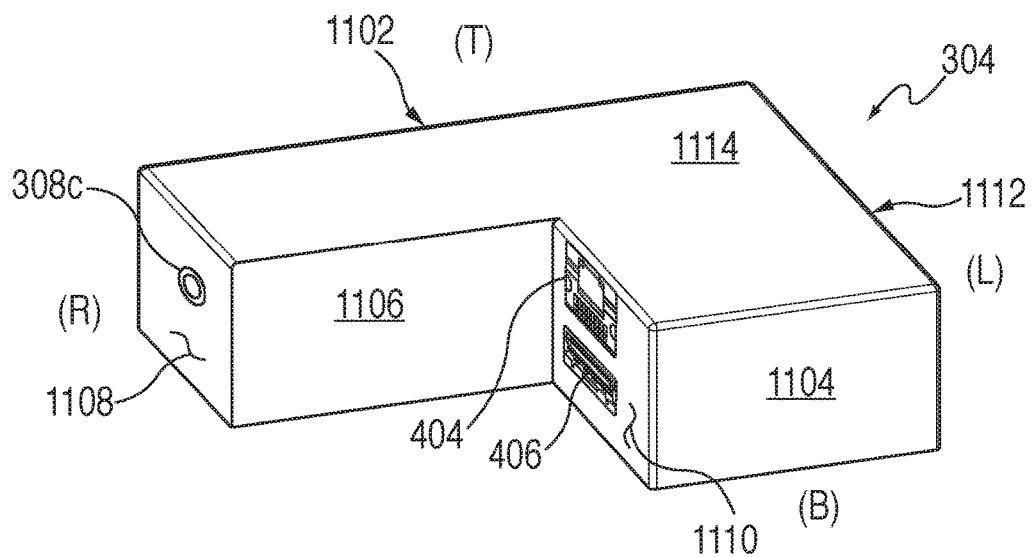

FIG. 12 illustrates an isometric view of the circuitry enclosure of FIG. 11 according to aspects of the embodiments.

Figure 13:
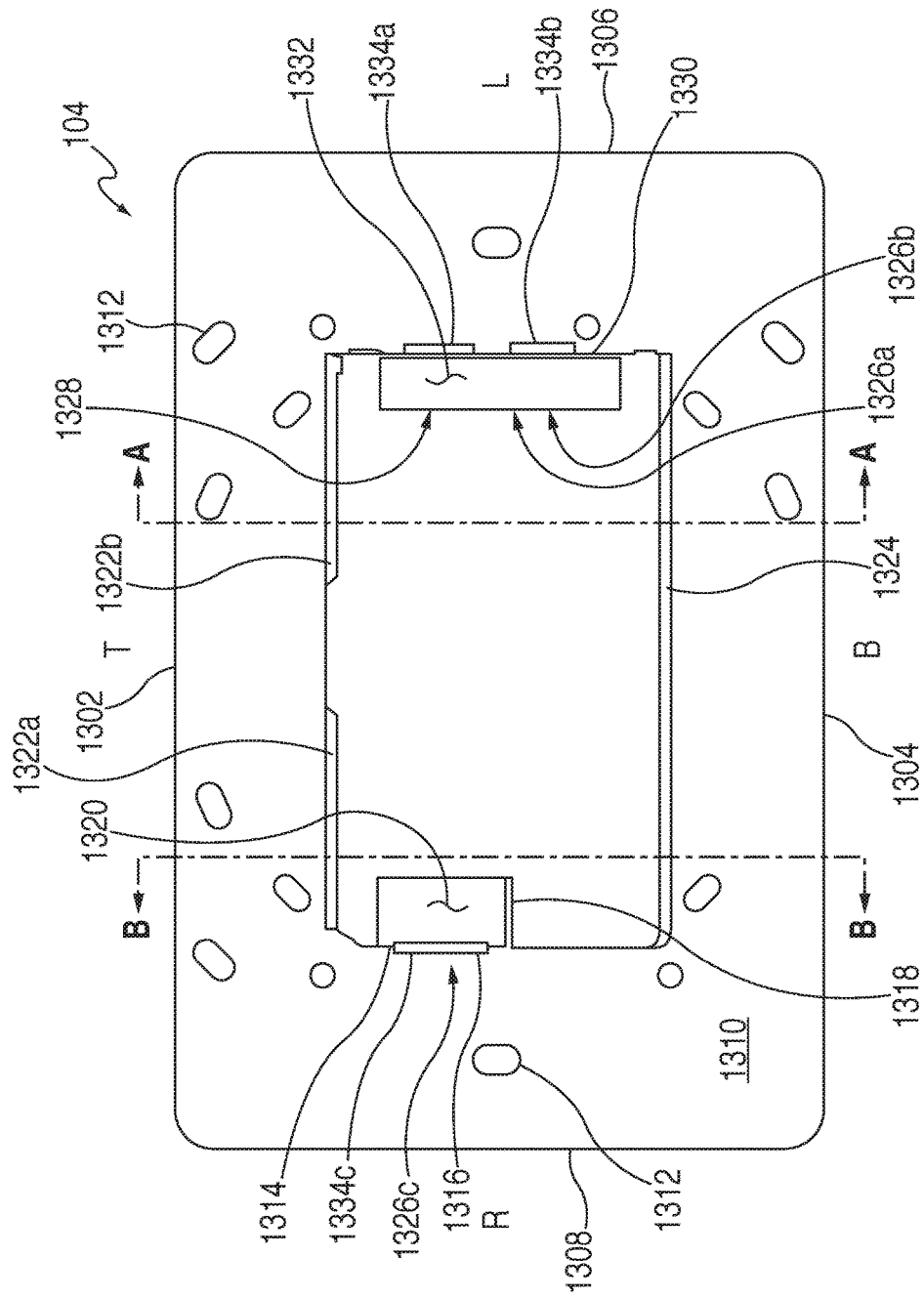

FIG. 13 illustrates a rear view of a mounting bracket for use with the wall mounted touch screen control device of FIG. 1 according to aspects of the embodiments.

Figure 14:
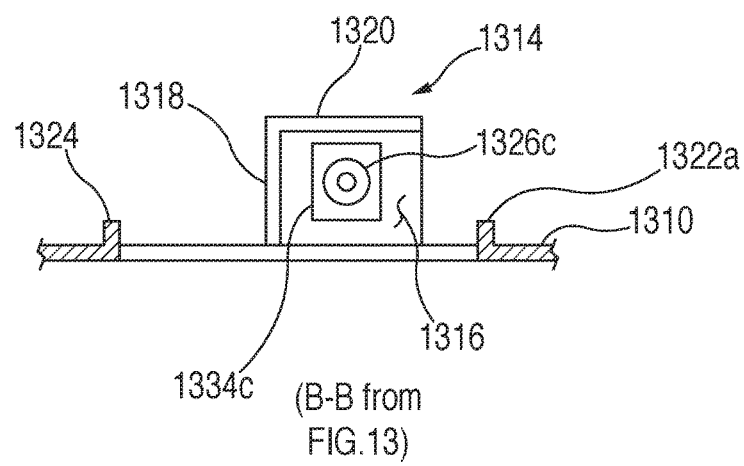

FIG. 14 illustrates a view along lines B-B in FIG. 13 of the mounting bracket according to aspects of the embodiments.

Figure 15:
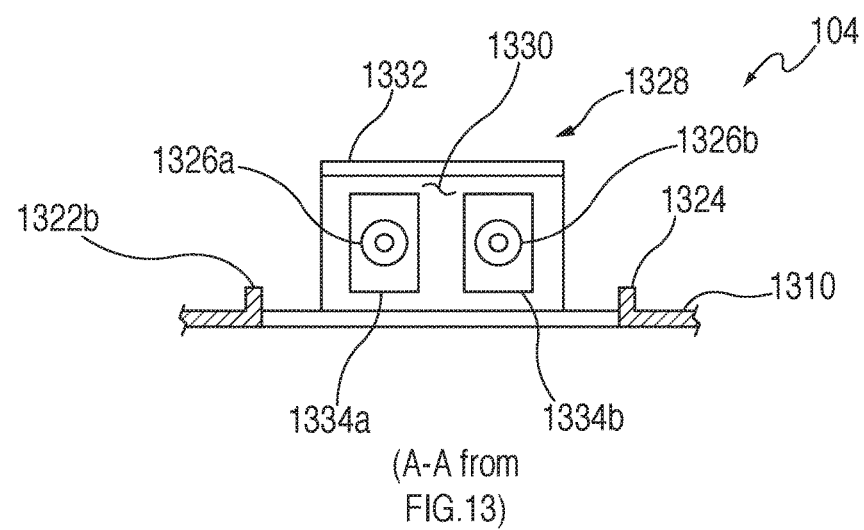

FIG. 15 illustrates a view along lines A-A in FIG. 13 of the mounting bracket according to aspects of the embodiments.

Figure 17:
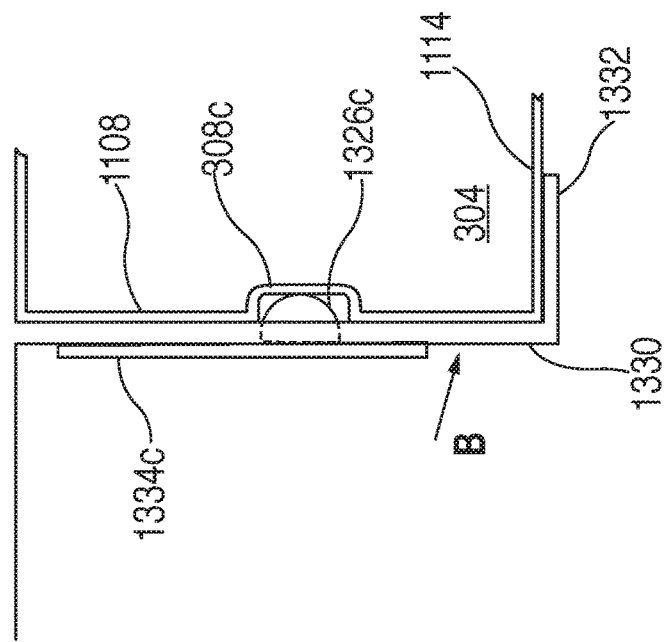
Figure 16:
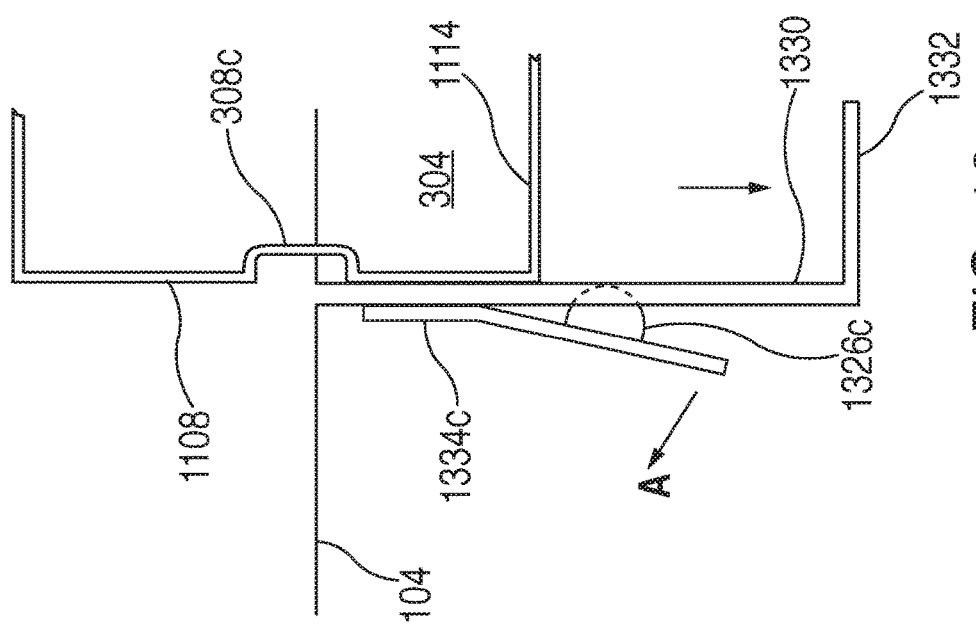

FIGS. 16 and 17 illustrate the insertion of the circuitry enclosure into the mounting bracket according to aspects of the embodiments.

DETAILED DESCRIPTION

The embodiments are described more fully hereinafter with reference to the accompanying drawings, in which aspects of the embodiments are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the aspects of the embodiments to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular device or class of devices used for control, such as touch screen control devices with a substantially thin wall mounting profile and integrated speakers.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments. Further still, it should be apparent to those of skill in the art that while certain items in the drawing Figures have been denoted "top," "bottom," "left side," right side," and the like, such spatial indicators are or can be arbitrary, and are done for the purposes of making it easier for the reader to understand and visualize the aspects of the embodiments and are not to be construed in a limiting manner.

List of Reference Numbers for the Elements in the Drawings in Numerical Order

The following is a list of the major elements in the drawings in numerical order.

100 Touch Screen Wall (TSW) Assembly
102 Touch Screen Control Device with Speakers (Touch Screen Device (TSD))
104 Mounting Bracket
106 Electrical Junction Box
108 Mounting Screws
110 Mounting Screw Receptacles
202 Front Surface
204 Right Side
206 Top
208 Left Side
210 Bottom
212 Rear Surface
214 Speaker
216 Display Panel
218 Display Panel Frame (Frame)
220 Camera
222 Microphone (Mic)
224 Light Sensor
302 Substantially Planar Portion
304 Circuitry Enclosure
306 Engagement Clip
308 Dimpled Mounting Recess
310 Recessed Planar Portion
312 Top Chamfered Surface
314 Left Side Chamfered Surface
316 Bottom Chamfered Surface
318 Right Side Chamfered Surface 404 Ethernet Port
406 Universal Serial Bus (USB) Port
1102 Top of Circuitry Enclosure
1104 Bottom Left of Circuitry Enclosure
1106 Bottom Right of Circuitry Enclosure
1108 Top Right of Circuitry Enclosure
1110 Bottom Right of Circuitry Enclosure
1112 Left Side of Circuitry Enclosure
1114 Rear Surface of Circuitry Enclosure
1302 Top Side of Mounting Bracket
1304 Bottom Side of Mounting Bracket
1306 Left Side of Mounting Bracket
1308 Right Side of Mounting Bracket
1310 Rear Surface of Mounting Bracket
1312 Mounting Holes of Mounting Bracket
1314 First Electronics Enclosure Cage (First Cage)
1316 First Vertical Surface of First Cage
1318 Second Vertical Surface of First Cage
1320 Horizontal Surface of First Cage
1322 First Electronics Enclosure Wall
1324 Second Electronics Enclosure Wall
1326 Dimpled Mounting Protrusion
1328 Second Electronics Enclosure Cage (Second Cage)
1330 Vertical Surface Second Cage
1332 Horizontal Surface Second Cage
1334 Spring Loaded Dimple Mount List of Acronyms Used in the Specification in Alphabetical Order The following is a list of acronyms used in the specification in alphabetical order.
LCD Liquid Crystal Display
LED Light Emitting Diode
Mic Microphone
TSD Touch Screen Device
TSW Touch Screen Wall
USB Universal Serial Bus
H Height
W Width
D Depth
IEEE Institute of Electrical and Electronic Engineers
PoE Power over Ethernet
Cat5 Category 5 Ether The different aspects of the embodiments described herein pertain to the context of a touch screen control device that has integrated within it one or more speakers, but yet which maintains a substantially thin mounting profile, but is not limited thereto, except as may be set forth expressly in the appended claims.

For over 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life to those who work and live in commercial buildings, universities, hotels, hospitals, and homes, among other locations. Accordingly, the systems, methods, and modes of the aspects of the embodiments described herein, as embodied as touch screen control device 100 that has integrated within it one or more speakers, but yet which maintains a substantially thin mounting profile, can be manufactured by Crestron Electronics Inc., located in Rockleigh, N.J., which can be marketed and sold under the name of "TSW-XX60 Wall Mount Touch Screen Family."

FIG. 1 illustrates a front isometric view of wall mounted touch screen control device assembly (assembly) 100 according to aspects of the embodiments. Assembly 100 comprises touch screen control device (touch screen device (TSD)) 102, mounting bracket 104, electrical junction box (box) 106, mounting screws 108, and mounting screw receptacles 110 according to aspects of the embodiments. Box 106 can be a conventional junction box, known to those of skill in the art, or can be a specially built junction box, but in either case, in this use, it provides a means for mounting TSD 102 to the wall in a substantially secure but readily and relatively easily removable manner, as described below.

FIG. 2 illustrates a front isometric view of TSD 102 with integrated speakers 214, FIG. 3 illustrates a left side rear isometric view of TSD 102, FIG. 4 illustrates a right side view of TSD 102, FIG. 5 illustrates a front view of TSD 102, FIG. 6 illustrates a left side view of TSD 102, FIG. 7 illustrates a top view of TSD 102, FIG. 8 illustrates a bottom view of TSD 102, FIG. 9 illustrates a rear view of TSD 102, and FIG. 10 illustrates a right side rear isometric left view of TSD 102, all according to aspects of the embodiments.

Referring now to FIG. 1, TSD 102 comprises front surface 202, which is comprised of display panel (display) 216, and frame 218. Display 216 is typically a flat panel liquid crystal display (LCD), the use of which in touch panels is substantially ubiquitous in currently available displays, but, as those of the skill in the art can appreciate, the aspects of the embodiments are not limited thereto. For example, there are light emitting diode (LED) back-lit LCD displays, and also LED displays in use as well. TSD 102 further comprises right side 204, top 206, left side 208, and bottom 210. In addition, there is also rear surface 212, and located on both right and left sides respectively, first and second speakers 214a,b, though none or only one speaker 214 can be included in TSD 102 according to aspects of the embodiments. As can be seen in FIG. 2, TSD 102 has a width W, height H, and depth (or thickness) D. According to aspects of the embodiments, TSD 102 is substantially flat and planar, and has dimensions of W that are many multiples of the depth D, and dimensions of H that are also many multiples of the depth D (but not as many as in regard to the width W). According to aspects of the embodiments, H can range from about 3.649" to about 6.451", W can range from about 5.560" to about 10.114", and D, which can also be considered the distance from the wall upon which TSD 102 is mounted to the front panel, is about 0.468", and can range from about 0.4212" to about 0.5148", according to aspects of the embodiments.

TSD 102 also further includes chamfered edges on the right, left, top, and bottom sides, and which are shown more clearly in other Figures (see, e.g., FIG. 6, described in greater detail below). Also shown in FIG. 2 are camera 220, and mics 222a,b, and light sensor 224; as those of skill in the art can appreciate, camera 220 can provide many different uses: security, communications through video "chat" services such as Skype®, among others (including video conferencing). The output of camera 220 can be shown on the same TSW assembly 100, or can be sent to other TSWs 100, via H.264 IP steam. Camera 220 can also be used to take snapshots, or photos, which can then be used for many different applications such as badges, identity cards, and the like. Mics 222a-c provide a means for a user to communicate through voice alone, or in conjunction with camera 220, through an audio/video interface, and speakers 214 can reproduce sounds such as voice, music, tones, beeps, whistles, among other types. Speakers 214a,b can also be stereo speakers, and can provide intercom capability when used with mics 222*a,b*. According to still further aspects of the embodiments, TSD 102 can conform to ITU-T Recommendation P.340: Transmission Characteristics and Speech Quality Parameters of Hands-Free Terminals. Further still, TSD 102 can support 16 KHz audio playback.

According to aspects of the embodiments, light sensor 224 can be further included. Such light sensor 224 can be used to automatically adjust the back-light illumination level of TSD 102 based on room brightness.

FIG. 3 illustrates a left side rear perspective (or isometric) view of TSD 102 according to aspects of the embodiments. In FIG. 3, it can be seen that TSD 102 comprises substantially planar portion 302, circuitry enclosure 304 (which is described in greater detail in FIGS. 11-15, along with mounting bracket 104), an optional engagement clip 306 (which can be used to facilitate securing of TSD 102 to box 106), a plurality of dimpled mounting recesses 308, recessed planar portion 310 (which, as its name implies, is a slightly recessed planar area surrounding circuitry enclosure 304, and is generally rectangular in shape in these aspects of the embodiments), top chamfered surface 312*a,b*, left side chamfered surface 314*a,b*, bottom chamfered surface 316, and right side chamfered surface 318*a,b*, according to aspects of the embodiments.

According to aspects of the embodiments, the chamfered surfaces (312, 314, 316, and 318) are formed at about an angle of $\theta_1$ (shown in FIG. 6) from rear surface 212, which is about 18°, and which can range from about 10° to about 26° according to aspects of the embodiments. Because of their location about the perimeter of TSD 102, the chamfered surfaces provide a means for relatively easy removal of TSD 102 from junction box 106. That is, the chamfered surfaces 312, 314, 316, and 318 provide a means for a user to insert their finger or fingers in order to pry TSD 102 from its mounting bracket 104 that will remain secured to box 106. The mounting of TSD 102 to bracket 104 and box 106 is described in greater detail below in regard to FIGS. 11-15.

As can be seen in the Figures, the chamfered surfaces 312, 314, 316, 318, are formed along an outer portion that surrounds a periphery of a rear surface of TSD 102. The outer portion has a certain, predefined width that can vary from between about a first distance to about a second distance. As can be further seen in FIGS. 3, 9, and 10, the chamfered surfaces 312, 314, 316, 318 that comprises the outer portion of the rear surface of TSD 102 includes a majority of the outer portion. The chamfered surfaces 312, 314, 316, 318 provides an aesthetically pleasing appearance to TSD 102, as well as facilitating installation of TSD 102 into mounting bracket 104 and then into junction box 106 according to aspects of the embodiments.

FIG. 4 illustrates a right side view of TSD 102, and in this view both Ethernet port 404 (which can be an RJ45 type receptacle, as those of skill in the art can appreciate) and universal serial bus (USB) port 406 can be seen on the right side of circuitry enclosure 304 according to aspects of the embodiments. Ethernet port 404 can be used to connect an Ethernet cable to TSD 102, for both data communications and power-over-Ethernet (PoE) purposes; that is, one cable, an Ethernet cable, can connect to TSD 102 and communication data and commands to and from TSD 102 to different devices, and carry power to TSD 102 using known PoE techniques.

As those of skill in the art can appreciate, the Institute of Electrical and Electronic Engineers (IEEE) standard for PoE requires category 5 (Cat5) cable or higher for high power levels, but can operate with category 3 cable if less power is required. Power can be supplied in common mode over two or more of the differential pairs of wires found in the Ethernet cables, and comes from a power supply within a PoE-enabled networking device such as an Ethernet switch, or can be injected into a cable run with a mid-span power supply. A mid-span (PoE) power injector is an additional PoE power source that can be used in combination with a non-PoE Switch. Mid-span devices currently available operate in accordance with two IEEE standards: those operating in accordance with IEEE 802.3af provide about 15.4 watts per port (or link), and those operating in accordance with IEEE802.3 at (PoE Plus) can provide to about 25.5 watts per port.

USB port 406 can be used to connect a USB cable to TSD 102; however, according to aspects of the embodiments, a user can also use USB port 406 to connect a flash drive to TSD 102 in order to transfer data between TSD 102 and the flash drive; that is, users can download programs to TSD 102 to provide up-to-date changes and capabilities, or to retrieve data in some circumstances. Through implementation of Ethernet port 404 and USB port 406 there is built in redundancy for data gathering and program/application downloading.

As seen in FIGS. 2-4, 6, and 10, each of the left and right speakers 214*a,b* are mounted on respective side walls such that their long axis is substantially vertical, and the bulk of the speaker, which is contained within the frame of TSD 102, faces inwardly, in a substantially horizontal direction, so that a minimal amount of depth is needed to mount TSD 102 according to aspects of the embodiments.

FIG. 11 illustrates a rear view of circuitry enclosure 304 for use with TSD 102. Circuitry enclosure 304 includes top 1101, bottom right side 1104, bottom left side 1106, top right side 1108, bottom right side 1110, left side 1112, and rear surface 1114. FIG. 12 illustrates an isometric view of circuitry enclosure 304 in which Ethernet port 404 and USB port 406 are seen located on bottom right side 1110. Located on top right side 1108 is dimple mounting recess 308*c*; dimple mounting recesses 308*a,b* are located on left side 1112.

Circuitry enclosure 304 is manufactured as an integral component of TSD 102 according to aspects of the embodiments, though it could be a separate component that could be attached to rear surface 212 in other aspects of the embodiments. Circuitry enclosure 304 provides the means for mounting TSB 102 to junction box 106 such that TSD 102 is substantially parallel with the wall upon which it is mounted, and, because of its relative thinness compared to other wall mount controllers, is mounted relative close to the surface of the wall. In use, circuitry enclosure 304 is inserted into mounting bracket 104 that has been screwed to, or attached in some substantially similar manner, junction box 106 according to aspects of the embodiments. Insertion of circuitry enclosure 304 can only be done in one orientation because of the substantially matching "L" shapes of circuity enclosure 304 and mounting bracket 104. Further, as will be explained in greater detail in regard to FIGS. 12-15, the spring loaded dimpled mounting protrusions 1326*a-c* of mounting bracket 104 fit into dimpled mounting recesses 308*a-c* to retain TSD 102 to mounting bracket 104 and junction box 106 according to aspects of the embodiments.

FIG. 13 illustrates a rear view of mounting bracket 104 for use with TSD 102 according to aspects of the embodiments. Mounting bracket (bracket) 104 comprises top side 1302, bottom side 1304, left side 1306, right side 1308, and rear surface 1310. Rear mounting surface is substantially planar except in the portions as described below. Also part of bracket 104 are a plurality of mounting holes 1312, first electronics enclosure wall 1322, and second electronics enclosure wall 1324, the latter two of which are located such that they fit about the walls of circuitry enclosure 304. Two sub-assemblies are also included as part of bracket 104: first electronics enclosure cage (first cage) 1314, and second electronics enclosure cage (second cage) 1328. First cage 1314 comprises first vertical surface of first cage 1316, second vertical surface of first cage 1318, horizontal surface of first cage 1320, and spring loaded dimple mount 1334c, upon which is mounted dimpled mounting protrusion 1326c. The assembly of the parts of first cage 1314 are such that they will fit about only one particular portion of circuitry enclosure 304; that which is comprised of the surfaces of top right 1108, and bottom right 1106; that is, the right side of circuitry enclosure 304 according to aspects of the embodiments.

Second cage 1328 comprises vertical surface second cage 1330, horizontal surface second cage 1332, and spring loaded dimple mounts 1334a,b, upon which are mounted dimpled mounting protrusions 1326a,b. The assembly of the parts of second cage 1328 are such that they will fit about only one particular portion of circuitry enclosure 304; that which is comprised of the surfaces of bottom left 1104, and left side 1112; that is, the left side of circuitry enclosure 304 according to aspects of the embodiments.

Referring now to FIG. 14, which illustrates a view along lines B-B in FIG. 13 of mounting bracket 104 according to aspects of the embodiments, first cage 1314 can be seen including spring loaded dimple mount (dimple mount) 1334c. According to aspects of the embodiments, dimple mount 1334c contains dimpled mounting protrusion 1326c, which, as shown and described below in regards to FIGS. 16 and 17, is designed to fit within dimpled mounting recess 308c that is located on top right surface 1108 of circuitry enclosure 304. According to aspects of the embodiments, the enclosure of dimpled mounting protrusion 1326c by dimpled mounting recess 308c (along with a substantially similar arrangement and enclosure by dimpled mounting recesses 308a,b of dimpled mounting protrusions 1326a,b) retains TSD 102 by bracket 104. Dimple mount 1334c can be attached to first cage 1314 by means of ultra-sonic welding, arc-welding, soldering, or by glues, or mechanical means of attachment such as screws, nuts and bolts, among other means of attachment.

Referring now to FIG. 15, which illustrates a view along lines A-A in FIG. 13 of mounting bracket 104 according to aspects of the embodiments, second cage 1328 can be seen including spring loaded dimple mounts (dimple mount) 1334a,b. According to aspects of the embodiments, dimple mounts 1334a,b contains dimpled mounting protrusions 1326a,b, which, as shown and described below in regards to FIGS. 16 and 17, is designed to fit within dimpled mounting recesses 308a,b that is located on left side surface 1112 of circuitry enclosure 304. According to aspects of the embodiments, the enclosure of dimpled mounting protrusions 1326a,b by dimpled mounting recesses 308a,b retains TSD 102 by bracket 104. Dimple mounts 1334a,b can be attached to second cage 1328 by means of ultra-sonic welding, arc-welding, soldering, or by glues, or mechanical means of attachment such as screws, nuts and bolts, among other means of attachment.

FIGS. 16 and 17 illustrate the insertion of circuitry enclosure 304 into mounting bracket 104 according to aspects of the embodiments. In FIG. 16, rear surface 1114 of circuitry enclosure 304, along right side 1108, is being forced against dimpled mounting protrusion 1326c as TSD 102 is being forced into mounting bracket 104. Spring loaded dimple mount 1334c is being forced in the direction of arrow A. Once circuitry enclosure 304 of TSD 102 has been inserted a predefined distance into mounting bracket 104 (FIG. 17), dimpled mounting recess 308c becomes co-located with dimpled mounting protrusion 1326c (dimpled mounting protrusion 1326c fits within a hole in vertical surface second cage 1330), and the spring action of spring loaded dimple mount 1334c causes it to move in the direction of arrow B such that dimpled mounting protrusion 1326c fits within dimpled mounting recess 308c; a substantially similar process occurs on the other side of mounting bracket 104 and circuitry enclosure 304, between dimpled mounting protrusions 1326a,b, and dimpled mounting recessed 308a,b according to aspects of the embodiments.

According to further aspects of the embodiments, magnets can be used to secure TSD 102 to either mounting 104, or in the absence of mounting bracket 104, TSAD 102 can be mounted directly to junction box 106, if the latter were made of a ferromagnetic material. According to further aspects of the embodiments, such magnets can include rare earth type magnets.

According to aspects of the embodiments, a table mount kit accessory can be used with TSD 102. The table mount kit allows TSD 102 to be placed onto a tabletop surface, such as on a conference room table for commercial applications, or on a bedside/chairside table for residential applications. The table mount kit can include a substantially non-slip surface on the table-contacting face that prevents TSD 102 from sliding across the table when a user presses display panel 216. In addition, a swivel assembly can be used that allows TSD 102 and table mount kit to be permanently secured to the table, where it can then also be rotated. According to still further aspects of the embodiments, a user can adjust the tilt angle of TSD 102. According to aspects of the embodiments, the tilt range can range from about 35° to about 50° from the horizontal.

INDUSTRIAL APPLICABILITY

To solve the aforementioned problems, the aspects of the embodiments are directed towards systems, methods, and modes for a touch screen control device that has integrated within it one or more speakers, but yet which maintains a substantially thin mounting profile.

The disclosed embodiments provide for a touch screen control device with integrated speakers and a substantially thin mounting profile. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A controller for use in controlling one or more controllable devices, and located on a wall, the controller comprising:
   a cubic enclosure, the cubic enclosure including a front surface that is a substantially flat planar surface, a left and right side, a top and bottom side, and a rear surface;
   an interactive display panel disposed on the front surface of the controller, wherein the front surface is adapted to provide access to the display panel;
   a circuitry enclosure attached to the rear surface of the controller, the circuitry enclosure adapted to enclose controller circuitry, and is further adapted to interface with a junction box located in the wall, such that the controller is removably attachable to the junction box; and
   a plurality of chamfered surfaces formed on the rear surface, the chamfered surfaces adapted to provide a removing function for the controller, when it is desired to remove the controller from the junction box.

2. The controller according to claim 1, wherein each of the plurality of chamfered surfaces comprises an angled surface that is formed at an angle of about 18° from the rear surface.

3. The controller according to claim 1, wherein each of the plurality of chamfered surfaces comprises an angled surface that is formed at an angle that ranges from about 10° to about 26° from the rear surface.

4. The controller according to claim 1, wherein the ratio of width of the controller to the depth of the controller is about 12.07, and wherein the ratio of height of the controller to the depth of the controller is about 7.80.

5. The controller according to claim 1, wherein the ratio of width of the controller to the depth of the controller is about 16.21, and wherein the ratio of height of the controller to the depth of the controller is about 10.12.

6. The controller according to claim 1, wherein the ratio of width of the controller to the depth of the controller is about 21.61, and wherein the ratio of height of the controller to the depth of the controller is about 13.78.

7. The controller according to claim 1, further comprising:
   a mounting bracket adapted to provide a mounting surface to the controller, and wherein
      the mounting bracket is adapted to interface with both the circuitry enclosure and the junction box.

8. The controller according to claim 7, wherein the mounting bracket comprises:
   a substantially planar portion adapted to interface with, and mount to, the junction box; and
   a three dimensional cubic portion of substantially similar size and dimension to the circuitry enclosure such that the circuitry enclosure fits in a removably attachable manner to the three dimensional cubic portion.

9. The controller according to claim 8, wherein the mounting bracket comprises:
   a plurality of substantially planar surfaces orthogonal to the substantially planar portion, wherein
      each of the substantially planar surfaces orthogonal to the substantially planar portion comprises a spring loaded dimple mount,
      each of the plurality of spring loaded dimple mounts including a dimpled protrusion, and
      each of the plurality of dimpled protrusions is adapted to fit within a respective one of a dimpled recess located on a corresponding surface of the circuitry enclosure, such that
      an interaction between each of the dimpled protrusions within the dimpled recesses causes the controller to be retained to the mounting bracket that is attached to the junction box.

10. The controller according to claim 9, wherein the chamfered surfaces provide access to a device to pry the controller out of and away from the junction box.

11. The controller according to claim 10, wherein each of the chamfered surfaces is adapted to be used by one or more fingers of a user to remove the controller from the junction box.

12. The controller according to claim 1, further comprising:
   one or more speakers, each of the one or more speakers located on either or both of a right side and left side of the controller, and wherein each of the one or more speakers comprises a long axis and a short axis, and further wherein the long axis of the speaker is substantially parallel to each of the left and right sides of the controller.

* * * * *